Nov. 29, 1955

H. GEHRE 2,724,967

CHANGE-OVER DEVICES FOR FLOW METER ARRANGEMENTS
WITH TWO MEASURING RANGES

Filed March 8, 1951

INVENTOR
HANS GEHRE

BY Burgess & Dieklage

ATTORNEYS

Nov. 29, 1955  H. GEHRE  2,724,967
CHANGE-OVER DEVICES FOR FLOW METER ARRANGEMENTS
WITH TWO MEASURING RANGES
Filed March 8, 1951  3 Sheets-Sheet 2
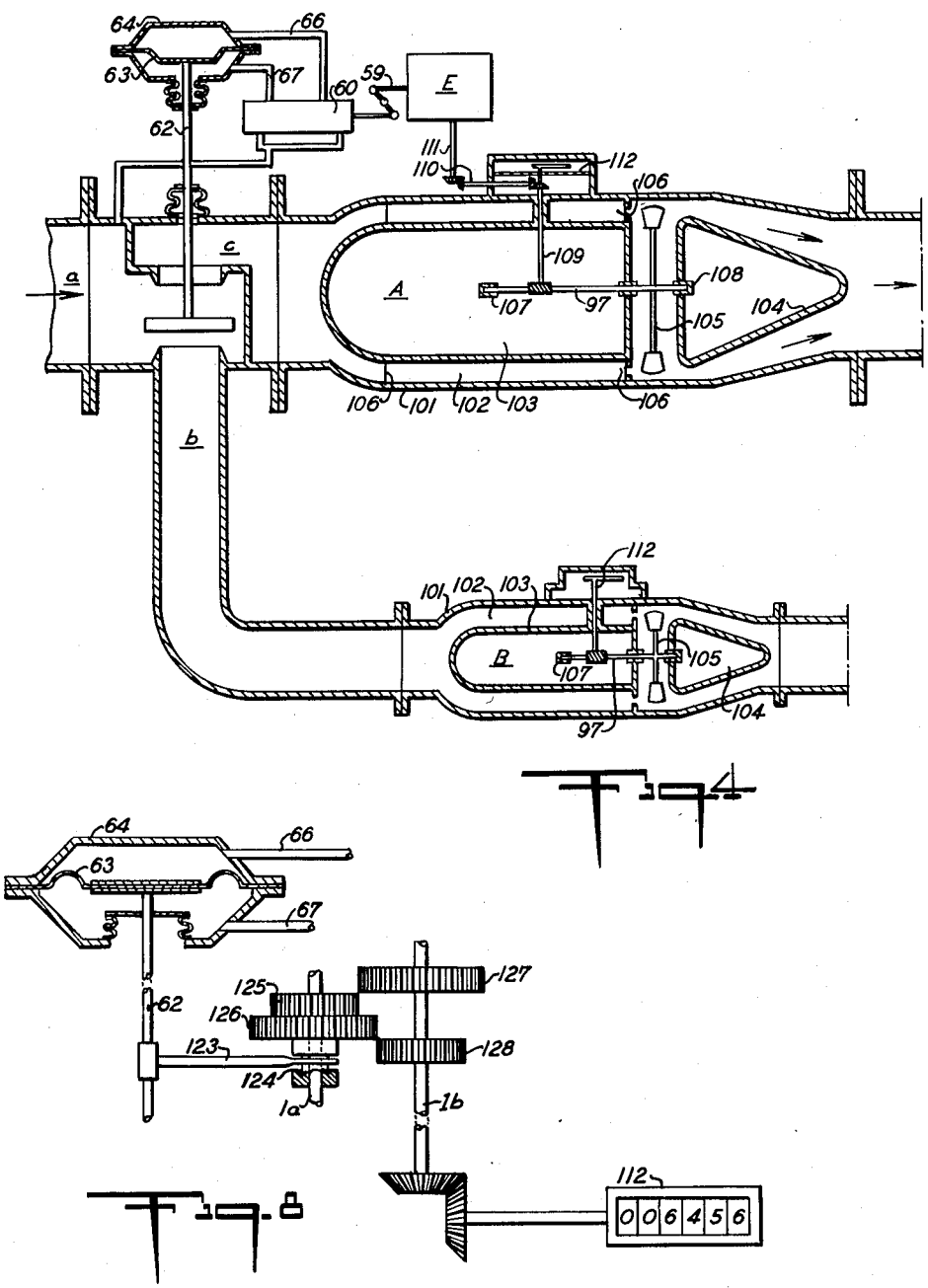
INVENTOR
HANS GEHRE
BY Burgess & Dinklage
ATTORNEYs

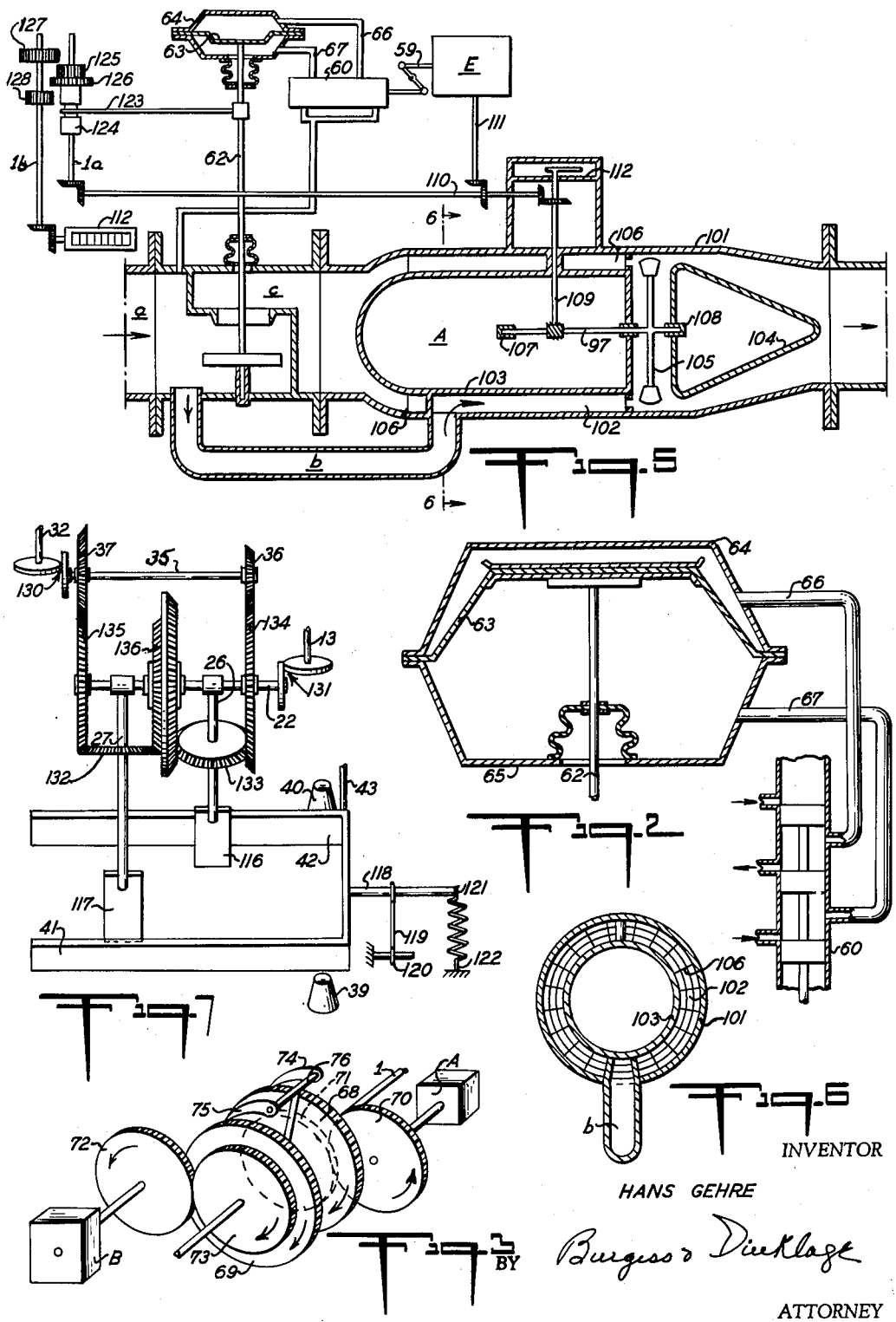

United States Patent Office 2,724,967
Patented Nov. 29, 1955

2,724,967

CHANGE-OVER DEVICES FOR FLOW METER ARRANGEMENTS WITH TWO MEASURING RANGES

Hans Gehre, Oberkassel am Rhine, Germany

Application March 8, 1951, Serial No. 214,487

Claims priority, application Germany March 8, 1950

8 Claims. (Cl. 73—197)

This invention relates to improvements in change-over devices for flow meter arrangements with two measuring ranges. It relates particularly to the automatic control in these change-over devices.

In meters used for flowing material automatically operated change-over devices for switching from one measuring range to another are known. In these known meters means are provided by an automatically operated change-over device for the alteration of the measurement to the lower or upper part of the measuring range depending on the rate of flow of the material. For example, the change-over may depend on a flow rate in excess or below a desired, definite rate of flow. In these known devices this change-over is effected by a valve which, when closed, forces the fluid to be measured through an auxiliary duct which is placed before the valve, to a small auxiliary meter. This auxiliary meter serves for the measurement of the lower part of the measuring range. The switching operation is usually controlled by a velocity comparing differential drive which is operated on the one side by the meter shaft at a velocity proportional to its number of revolutions, and on the other side at a constant comparison velocity corresponding to the desired reversal rate of flow. The switching member is controlled by the movement of the planet wheel shaft on this differential drive and a servo-motor.

These known devices provide no improvement in the technique of measuring itself and give rise to considerable disadvantages particularly in the change-over technique itself. This is because a satisfactory control of the change-over is not insured and auxiliary devices are necessary for producing and controlling the constant comparison velocity. These auxiliary devices include clockwork mechanisms, synchronizing motors and the like, which use a considerable amount of outside energy for their operation. As their function depends on outside conditions, such as the power supply, they require additional safety and supervisory arrangements. It of course follows that these known control devices are not satisfactory for change-over devices in Woltman meters.

A Woltman meter is a measuring wheel or turbine meter in which a central member is positioned in the gas duct to define an annular gas channel. The measuring wheel, i. e., wheel of the impulse type, is positioned in the narrowest portion of this annular channel. There are basically two types of Woltman meters, the older type, in which the entire insert which defines the annular channel rotates with the measuring wheel, and the newer type, in which the central insert is stationary and only the measuring wheel rotates.

Automatic change-over devices are known for use in Woltman meters, which include the use of one or the other of the measuring ranges in such meters. In some of these known devices the change-over is effected with a change-over valve as described above. In these devices when the valve is closed the fluid being measured is led through the auxiliary duct to the throttle-cross-section in front of the meter wheel corresponding to the lower part of the measuring range. In other known embodiments the change-over to the lower part of the measuring range is effected by sealing off a part of the throttle-cross-section in front of the metering wheel. This part is freed again by switching in the opposite direction.

In these known change-over devices the fluid flowing through is passed by changing the measuring to the lower part of the measuring range with an impulse which corresponds to about the fluid impulse being measured in the upper part of the measuring range. Thus the changing is controlled by the influence of the pressure difference which is set up in the throttle-cross-section in front of the meter wheel. This difference of pressure is usually so slight in Woltman meters, particularly in the range used for the change-over, that in order to obtain the necessary forces disproportionately large membranes or piston surfaces are necessary for the valve change-over.

Moreover the movement of the switching valve must provide that the pressure difference which is already small, alters at least a definite minimum amount. This means, however, particularly in low pressure meters a considerable displacement of the rate of flow against the amount chosen for the reversal. This amount must be so chosen that the measurement in the two parts of the measuring range remains within an allowable tolerance capable of calibration, a condition which however can no longer be fulfilled in these prior devices.

One object of this invention is a change-over device which is not subject to the aforementioned disadvantages. This and further objects will become apparent from the following description read in conjunction with the drawings in which:

Fig. 2 shows a cross section of a servo-motor;

Fig. 3 shows a perspective of a shift drive for using different meters according to the invention;

Fig. 4 shows a switch-over arrangement in which, at a predetermined rate of flow, the main meter is bypassed and gas is passed through an auxiliary meter;

Fig. 5 shows a switch-over arrangement in which only a single meter is present and at a predetermined rate of flow the measuring cross-section of the meter is increased or decreased;

Fig. 6 is a cross-section along the line A—A of the meter set forth in Fig. 5;

Fig. 7 shows an embodiment of the invention in which geared wheels and slipping couplings are employed to actuate the servo-motor; and Fig. 8 shows an arrangement whereby a movable gear controlled by the operating rod of the servo-motor drives the counting mechanism of the meter as well as the change-over device for the two measuring ranges.

Figure 1:
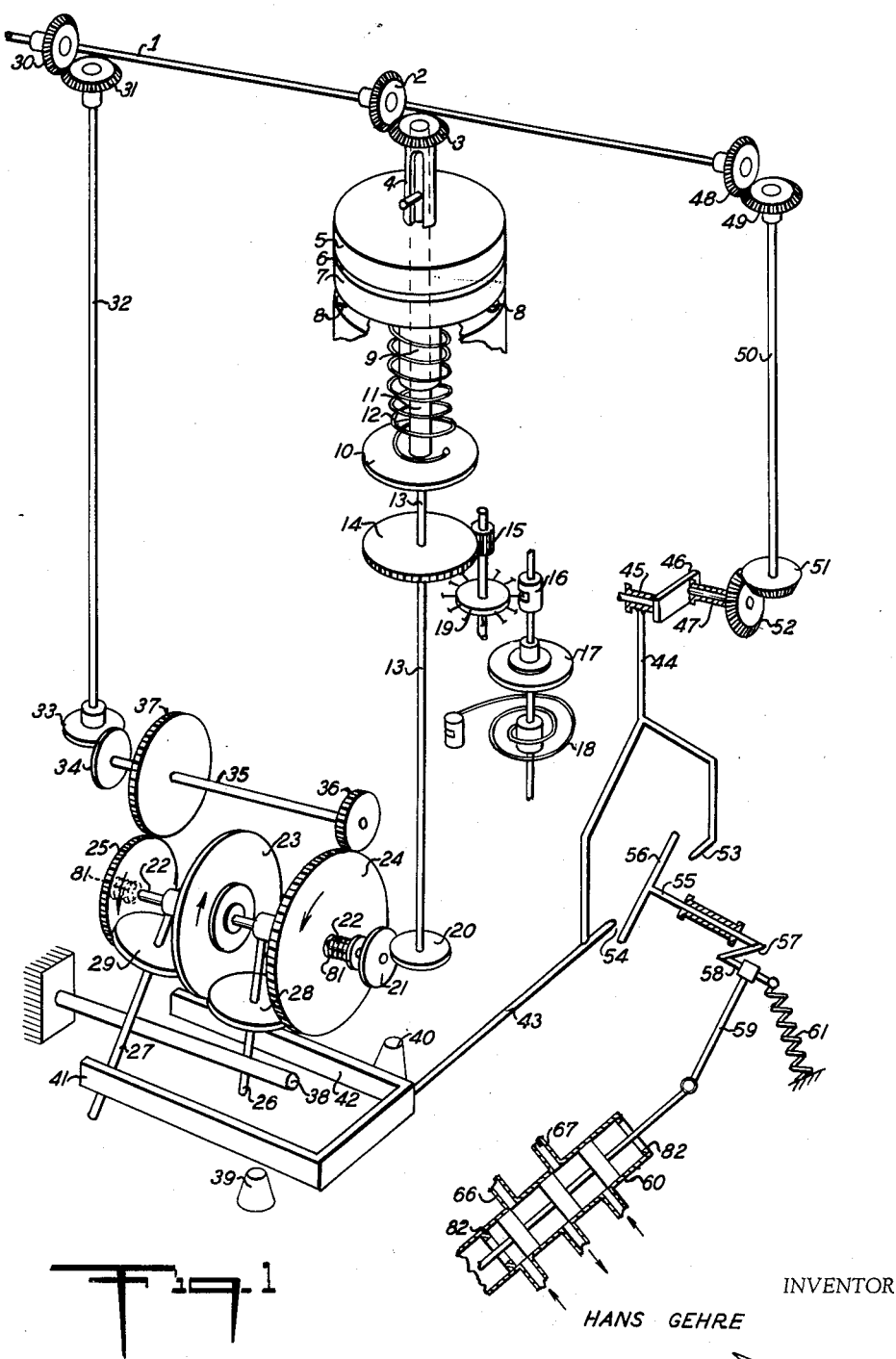
Fig. 1 shows in perspective view an embodiment of the control device according to the invention for Woltman meters with two ranges.

According to the invention a servo-motor serves as a drive for the change-over device, such as the valve or cover plate in the throttle-cross-section, with an operating partition (piston membrane or the like) controlled by the working pressure. A velocity comparing differential drive serves as the control for the passage of the working pressure to the servo-motor. The differential drive is operated on one side by the meter shaft at a velocity proportional to its number of revolutions and on the other side at a constant comparison velocity corresponding to the desired change-over rate of flow through the meter.

The velocity comparing differential drive according to the invention comprises three sun-wheels all of which receive their drive from the meter shaft. The central sun-wheel receives its rotation through a sliding coupling, its velocity of rotation being held constant by a balance movement. The two outer sun-wheels receive their rotation through gear mechanisms which rotate one at a multiple of the speed of the other. There are two planet wheels, each associated with a different outer sun-wheel and the center sun-wheel. The planet wheels are connected on different planet wheel shafts, the movement of which controls the change-over. One planet wheel shaft operates in one direction and the other in the opposite direction and each control the change-over from a different range.

In the control device construction according to the invention speed differences between the constant comparison velocity and the associated velocity of the meter shaft of a small fraction of a percent still insure the reversing movement of the change-over device. Due to this there is no shifting of the point where the change-over takes place and there is no alteration of the error value when the change-over occurs. This is important as the error value with reference to the calibration tolerances for the two measuring ranges was used in deciding the choice position of the change-over point.

The force necessary for controlling the change-over device is provided by the pressure difference. The change-over is initiated through the velocity of rotation of the meter shaft dependent on the corresponding impulse. The force is only a minimum fraction of that available and derived from the meter shaft. Because of the aforementioned high sensitivity of the control mechanism according to the invention the insertion of a relatively large reducing ratio is permitted so that the measuring wheel is not detrimentally affected by loading, and the error curve is in no way changed by the drive of the device.

The invention and its mode of operation will become more apparent by referring to the drawings.

In Fig. 1 the meter-shaft 1 drives a sliding-coupling through a pair of wheels 2, 3 and a catch 4. In the sliding-coupling one plate 5 transmits its rotation through an intermediate bearing 6 to the other plate 7, which in its turn is journalled on ball-bearings 8. The plate 7 carries a socket 9, in which a spindle 11 secured to a disc 10 is freely rotatable. The interconnection of the disc 10 with the plate 7 is effected by a spring 12. A shaft 13 is secured to the disc 10; on shaft 13 there is a sprocket wheel 14. This engages a pinion 15, the rotational movement of which is maintained constant by a balance movement 16, 17, 18 and an escapement-wheel 19.

The constant rotation of the shaft 13 obtained in this way is now transmitted as a comparison-rotation velocity over a pair of wheels 20, 21 and a shaft 22 to a sun-wheel 23 of a multiple differential-drive connected to the middle of this shaft 22. Further sun-wheels 24 and 25 are freely rotatable on the shaft 22. The planet-wheel shafts 26 and 27 also freely mounted on shaft 22 carry planet-wheels 28 and 29 formed as friction discs. The three sun-wheels 23, 24, 25 are lightly pressed together by the force of a spring 81 so that the engagement of the planet-wheels 28, 29 and the sun-wheels 23, 24, 25 is ensured.

The two outer sun-wheels 24 and 25 receive their drive from the meter-shaft 1 over a pair of wheels 30, 31 and a shaft 32 and a further pair of wheels 33, 34 and a shaft 35. On the latter two wheels 36 and 37 are secured the wheel 36, being associated with the sun-wheel 24 and the wheel 37 being associated with the sun-wheel 25. These comprise the comparison-differential. The arrangement is so chosen that the gear-ratio between the wheels 37 and 25 is a desired multiple of that between the wheels 36 and 24.

Three rigid stops are provided for limiting the pivoting of the planet-wheel shafts 26 and 27 comprising a central stop 38 which is engaged by the planet-wheel shafts 26 and 27 in their rest position, one on one side and one on the other, and two outer stops 39 and 40 between which a fork 41, 42 is movable in one direction under the action of one planet-wheel shaft and in the other direction under the action of the other planet-wheel shaft. The movement of this fork 41, 42 is transmitted to a pendulum-switch by a link 43. This pendulum-switch comprises a forked pendulum 44 which hangs freely from a pin 45 on a crank 46. The shaft 47 on which this crank is mounted receives its drive from the meter-shaft 1 over a pair of wheels 48, 49, a shaft 50 and a pair of wheels 51, 52.

The fork-pendulum 44 has two catches 53 and 54 which cooperate with a lever 56 mounted on a rotatable shaft 55. The rotation of the shaft 55 is transmitted over a crank 57, 58 and a coupling-rod 59 to a control by-pass valve 60 of a servo-motor. Thus the crank 57, 58 forms with a spring 61 secured to it a toggle device which snaps the control by-pass valve 60 to either end position against stops 82 and holds it there.

The servo-motor can for example be one of the many types of known piston or membrane pressure-switches, in which the working-pressure in the measuring-duct supplies the power necessary for the switching-operation. The construction of such servo-motors forms no part of the present invention. It is given here only by way of example and insofar as it is necessary for proper understanding of the invention.

Fig. 2 shows such a servo-motor. The switching member which is not shown (it may be the plate of a valve connected ahead of the meter or the cover-plate in the throttle-cross-section of one of the known Woltman-meter constructions mentioned at the beginning), is fixed on the operating shaft 62 of a membrane 63, which is movable back and forth or up and down in a housing 64, 65. The operating-travel of this change-over device is caused by the action of the working-pressure in the measuring-duct, which is led according to the position of the control by-pass valve 60 through one of the two ducts 66 and 67 to the appropriate side of the membrane 63. The membrane 63 and its operating-shaft 62 which operates the valve-member, are thus moved by the displacement of the material being measured located on the other side of the membrane from one to the other of its end positions. This switching operation is thus caused by the reversal of the control by-pass valve 60 by the control-device according to the invention.

In this control-device (Fig. 1), the proportions are now so chosen that the constant velocity of rotation of the shaft 13 given by the clockwork mechanism 15, 16, 17, 18 and 19 under the drive of the meter-shaft 1 corresponds to that partial loading of the meter and thus to that number of revolutions of the meter-shaft, at which the change-over from one to the other part of the measuring-range will have to take place.

If the number of revolutions of the meter falls below this value, the velocity of rotation of the sun-wheel 25 will be smaller than the constant comparison-velocity of rotation of the sun-wheel 23. Thus the planet-wheel shaft 27 of the planet-wheel 29 will swing in a direction the same as the direction of rotation of the sun-wheel 23, until it knocks against the branch 41 of the fork 41, 42 which it moves up to the stop 39. It thus operates the forked pendulum 44 by the link 43, of which the catch 53 reaches under the lever 56 of the switch-means. Because of the circular movement of the crank 46, the forked pendulum 44 will also move up and down and the catch 53 will swing the lever 56, whereby the spring 61 causes it to snap over to the end-position associated with this movement. To simplify the showing, the crank 57, 58 is indicated in a somewhat preceding phase.

Thus the control by-pass valve 60 of the servo-motor is jerked into the position shown in dotted lines in Fig. 2, where the servo-motor will be connected to the material being measured through the duct 66 so that the setting member (membrane 63) moves downwardly from its upper position and the change-over of the meter to the lower part of the measuring-range takes place.

After the ensuing change-over the material being measured flows only through a part of the throttle-cross-section in front of the meter-wheel corresponding to the lower part of the measuring-range. Because of this decrease of cross-section the velocity of flow on the meter-wheel rises and also the velocity of rotation. Because of this the velocity of rotation of the sun-wheel 25 now rises above the comparison-rotation velocity of the sun-wheel 23 and the planet-wheel shaft 27 is swung back in the direction of rotation of the sun-wheel 25 until the stop 38 ends this movement and only a slipping of the wheels 25, 29 and 23 against each other takes place.

The planet-wheel 28 next follows the direction of rotation of the sun-wheel 23, since the gear-ratio between the wheels 36 and 24 is many times smaller than that between the wheels 37 and 25, until the planet-wheel shaft 26 engages the stop 38.

If the rate of flow through the meter rises again, the velocity of rotation of the sun-wheel 24 also rises further. Because of the small gear-ratio chosen between the wheels 36 and 24, it attains the size of the comparison-velocity of rotation of the sun-wheel 23 if the velocity of rotation of the meter-shaft in the lower part of the measuring-range attains a value which corresponds to about the highest loading of the meter in the upper part of its measuring-range.

In further rises of the rate of flow the planet-wheel 28 follows the direction of rotation of the sun-wheel 24 with corresponding swinging of the planet-wheel shaft 26. This then moves towards the branch 42 of the fork 41, 42 which it moves up to the rigid stop 40. By this movement the forked pendulum 44 is swung in a corresponding sense and by its up and down movement the catch 54 engages the lever 56, whose position now varies by about 90° from that shown and changes its position after overcoming the tension of the spring 61.

Thus at the same time the control by-pass valve 60 becomes switched to the position shown, in which it connects the working pressure of the material being measured through the duct 67 to the lower side of the membrane 63 of servo-motor, whilst the space above the membrane becomes emptied through the duct 66. The membrane 63 moves upwards and effects the switching by means of the operating shaft 62 in the way described. Thereafter the whole throttle-cross-section in front of the measuring wheel can be passed through by the material being measured and the decreasing velocity of flow on the measuring wheel causes the velocity of rotation to be reduced again.

The gear-ratios between the wheels 37 and 25 on the one hand and the wheels 36 and 24 on the other hand are so chosen that a difference exists between the velocity of the measuring wheel after complete change-over to one range and the velocity at which change-over to the other range is effected, in order that the change in the impulse conditions at the meter-wheel consequent upon the change-over shall not produce an irregular change-over in the other direction.

The gear-ratios of the counting mechanism are naturally to be suited to the throttle-cross-section of the meter, given in the respective moment. This can be effected simply by arranging that at the same time through the membrane 63 of the servo-motor an adjustable gear-drive is controlled, which is included in the drive of the counting mechanism of the meter.

Such an adjustable gear-drive is shown in Fig. 8. Elements 62—67 are the same as those in Fig. 2. A connecting rod 123 is attached to the shaft 62. The gears 125, 126 on shaft 1a are slidable between an upper position at which gear 125 meshes with gear 127 and a lower position at which gear 126 meshes with gear 128. The up-and-down sliding actuation is effected by connecting rod 123 which has at its end a fork-shaped member which rides in a slotted bushing 124 connected to the gears 125, 126. Gears 127 and 128 are fastened in a stationary manner on shaft 1b, which is the shaft for the counting mechanism 112.

If the shaft 62 is switched in one direction, gears 125 (on shaft 1a) and 127 (on shaft 1b) contact one another, while, if shaft 62 is switched in the other direction, gears 126 (on shaft 1a) and 128 (on shaft 1b) contact one another. The switching of shaft 62 is effected for the change-over, due to the number of revolutions of the meter shaft 1 in the same manner as set forth with respect to Fig. 1. As such, in each of the two positions of the shaft 62, the counting mechanism drive is actuated with the proper gear drive.

The invention is not limited to the above-described embodiment and can also be carried out in various other ways.

Use can be made, for example, of ordinary toothed wheels instead of the friction wheels 29 and 28. In this case the stop 38 will be omitted and the swinging of the correspondingly shortened planet-wheel shafts 26 and 27 can be made effective on the branches of the fork 41, 42 by slipping-couplings.

Such an arrangement is illustrated in Fig. 7. Here slipping clutches 130 and 131 take the place of the wheel pairs 33—34 and 20—21, respectively. In addition, toothed wheels 132 and 133 take the place of friction wheels 29 and 28, respectively, and toothed wheels 136, 134, and 135 take the place of sun-wheels 23, 24, and 25, respectively. The two outer toothed wheels 134 and 135 receive their drive from meter shaft 1 over a pair of wheels 30, 31 and shaft 32 as described with respect to Fig. 1. Here shaft 32 drives the slipping clutches 130 and 131, which drive shaft 35 on which wheels 36 and 37 are secured. Wheel 36 is associated with toothed wheel 134 and wheel 37 is associated with toothed wheel 135. As toothed wheels 134 and 135 are activated, they give impetus to toothed wheels 133 and 132, respectively, which are associated with and operate toothed wheel 136, the arrangement being so chosen (as with Fig. 1) that the gear-ratio between wheels 37 and 135 is a desired multiple of that between wheels 36 and 134. The shafts 26 and 27 are shortened so that they extend only a short distance from toothed wheels 132 and 133. At the end of shaft 26, there is a flat spring 116 and at the end of shaft 27, a flat spring 117.

One arm of the fork 41 is contacted by spring 117 in one direction, and the other arm of the fork 42 is contacted by spring 116 in the other direction. The movement of the fork is limited by stops 39 and 40. The fork is mounted for movement between the stops 39 and 40 with the arrangement 118—122. Pin 118 is pivotally connected to point 120 by connecting rod 119. A spring 121 connects the end of pin 118 to a stationary point 122.

The arrangement operates in the same manner as that arrangement shown in Fig. 1, wherein fork branches 41 and 42 operate the fork pendulum through the member 43.

The control-device according to the invention is also capable of use for interconnection arrangements of meters and not only in such cases where the main meter is a Woltman meter but also if the main meter is any suitable meter for flowing material, for example a rotary-displacement meter or the like.

For interconnection the drive of shaft 1 is preferably effected by means of a shift drive by both meters in interconnection which takes its drive from the quicker-running meter.

Such a shift-drive is illustrated by way of example in Fig. 3 of the drawings.

It consists of a pair of ratchet wheels 68, 69 like the sun-wheels of a differential-drive freely rotatable on the shaft 1, one of which is driven by wheels 70, 71 from meter A and the other by wheels 72, 73 from meter B. The ratchet-wheels 68, 69 cooperate with two pawls 74, 75 which are mounted in the same direction on a T-shaped crank 76, which is secured between the ratchets 68, 69 to the shaft 1 and effects its driving. If meter A runs faster, the drive is effected through the pawl 74 whilst the pawl 75 slides over the teeth of the ratchet 69. If meter B runs faster, the drive is effected through the pawl 75, whilst the pawl 74 slides over the teeth of the ratchet 68.

Fig. 4 shows a switch-over arrangement in which, at a predetermined rate of flow the main meter is by-passed and gas is passed through an auxiliary meter. The main meter is represented by A and the auxiliary meter by B. Pipe 101 has a two-piece baffle flow guide body. A ring channel 102 is located in both portions of the two-piece body and is defined around meters A and B. 103 in each case represents the forward portion of the two-piece body within pipe 101, while 104 represents the rear portion thereof. At an opening between the forward and rear portions of the body, the measuring wheel 105 is positioned, the wings of which are extended into the ring channel 102, wherein the wings are exposed to the flow of gas. Ring channel 102 is sub-divided in a number of partial flow channels by longitudinal ribs 106. When gas passes through pipe 101, the rotary motion of measuring wheel shaft 97 (a measuring wheel shaft as per shaft 1 in Fig. 1) positioned at 107 and 108 is transferred to the reversing device E through shafts 109, 110, and 111, and thereupon to the counting mechanism 112.

When the lower measuring range limit of the main meter A is reached, the reversing device so regulates the servo-motor and the valve switch that valve C is closed in its upper position, causing conduit $a$ of the main meter A to be closed off and permitting the entire gas stream to be led through the auxiliary conduit $b$ into the auxiliary meter B.

Figs. 5 and 6 show an arrangement whereby a multi-range meter is employed and reversing takes place between two measuring ranges of this multi-range meter. The elements described in Figs. 5 and 6 are the same as those in Fig. 4 for the corresponding numbers. Here, however, channel 102 has the auxiliary conduit $b$ connected to it. The valve C in this case possesses only one seat, i. e., for the closing of main conduit $a$. The auxiliary conduit $b$ is open at all times. When valve C is open, the gas current flows equally through all portions of the ring channel 102, thus constituting the higher range of the meter. When valve C is closed, however, only the auxiliary conduit B is in operation and correspondingly only those portions of the ring channel used on the lower measuring range are open to the flow of gas therethrough, the remainder being closed by means of valve C. In this arrangement only the single counting mechanism 112 is needed for registering the entire gas flow.

I claim:

1. In a meter arrangement having a drive shaft, a counting mechanism, two measuring ranges for material flowing in pipe lines and a servo-motor-operated valve for switching from one range to the other, the improvement which comprises a velocity comparing differential drive having two outer and one center sun-wheels, rotational motion transmitting means transmitting rotational motion from the drive shaft of such a meter arrangement to the two said outer sun-wheels at different fixed ratios of rotational motion, means for transmitting rotational power from the drive shaft to said center sun-wheel at a constant rotational velocity including a second shaft, a slipping clutch inter-connecting said shafts and an escapement controlled balance movement connected with said second shaft and maintaining the rotational velocity thereof constant, two planet-wheels, each positioned in rotational contact with said center sun-wheel and a different outer sun-wheel, a pair of movably positioned planet-wheel shafts each carrying one of said planet-wheels, actuating means connected with said servo-motor operated valve, and means selectively connecting one or the other of said planet-wheel shafts with said actuating means, whereby one planet-wheel shaft actuates the servo-motor in one direction and the other in the opposite direction.

2. Improvement according to claim 1, in which said planet-wheels are friction wheels, and further comprising three rigid stops positioned for limitation of the movements of said planet-wheel shafts including a middle stop and two outer stops, said middle stop being positioned for limiting either of said planet-wheel shafts at rest, one of said outer stops being positioned for limiting the outer movement of one of said planet-wheel shafts, said other outer stop being positioned for limiting the outer movement of the other of said planet-wheel shafts.

3. Improvement according to claim 2, in which said selectively connecting means for shifting said actuating means includes fork means movably positioned between said two outer stops for actuation contact with one said planet-wheel shaft upon movement of that planet-wheel shaft in one direction and the other planet-wheel shaft upon movement of that planet-wheel shaft in the opposite direction, whereby said movement in one direction effects operation of the servo-motor one way and movement in the opposite direction effects movement of the servo-motor in the opposite direction.

4. Improvement according to claim 1, in which said selectively connecting means for operating said actuating means for the servo-motor operated valve comprises a fork movably positioned for moving contact in one direction with one said planet-wheel shaft and in the other direction with said other planet-wheel shaft, a third shaft driven by said drive shaft and having a crank and crank-pin thereon, and a pendulum linked to said fork and hanging from said crank-pin and having two catches, one of which displaces said actuating means by the swinging in one direction and the other by the swinging in the opposite direction.

5. Improvement according to claim 4, in which said actuating means is actuated by a toggle device positioned for operational contact with the catches on said pendulum.

6. Improvement according to claim 1, in which said servo-motor-operated valve includes a servo-motor with a movable operating rod and a movable gear connected to said operating rod positioned for driving said counting mechanism.

7. Improvement according to claim 1, in which the meter arrangement comprises a main meter for measuring velocity flow above a predetermined velocity and an auxiliary meter for measuring velocity flow below said predetermined velocity, and means selectively connecting said drive shaft with the more rapidly moving meter.

8. Improvement according to claim 7, in which said last-mentioned means includes a T-shaped crank connected to said drive shaft, two sprocket wheels mounted for free rotation on said drive shaft on opposite sides of said T-shaped crank, two pawls positioned on said T-shaped crank, each of said pawls in engagement with a different sprocket wheel, and means connecting one of said sprocket wheels for rotation with said main meter, and means connecting the other of said sprocket wheels for rotation with said auxiliary meter.

References Cited in the file of this patent

UNITED STATES PATENTS

| | | |
|---|---|---|
| 742,136 | Tilden | Oct. 20, 1903 |
| 887,772 | Clark | May 19, 1908 |
| 934,504 | Connet | Sept. 21, 1909 |
| 1,759,384 | Wilkin et al. | May 20, 1930 |
| 2,425,720 | Bergman | Aug. 19, 1947 |